United States Patent
Cao et al.

(10) Patent No.: US 10,824,819 B2
(45) Date of Patent: Nov. 3, 2020

(54) GENERATING WORD VECTORS BY RECURRENT NEURAL NETWORKS BASED ON N-ARY CHARACTERS

(71) Applicant: ALIBABA GROUP HOLDING LIMITED, George Town (KY)

(72) Inventors: Shaosheng Cao, Hangzhou (CN); Jun Zhou, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 0 days.

(21) Appl. No.: 16/879,316

(22) Filed: May 20, 2020

(65) Prior Publication Data

US 2020/0279080 A1    Sep. 3, 2020

Related U.S. Application Data

(63) Continuation of application No. PCT/CN2019/072081, filed on Jan. 17, 2019.

(30) Foreign Application Priority Data

Feb. 5, 2018 (CN) .......................... 2018 1 0113710

(51) Int. Cl.
*G06F 40/279* (2020.01)
*G06F 40/284* (2020.01)
(Continued)

(52) U.S. Cl.
CPC ............. *G06F 40/40* (2020.01); *G06F 40/30* (2020.01); *G06N 3/0445* (2013.01); *G06N 3/08* (2013.01)

(58) Field of Classification Search
CPC ........ G06F 40/279; G06F 40/284; G06F 3/04; G06N 3/02; G06N 20/00
(Continued)

(56) References Cited

U.S. PATENT DOCUMENTS 9,037,464 B1 * 5/2015 Mikolov ............... G06F 40/279
704/255
9,846,836 B2 * 12/2017 Gao ..................... G06F 16/9032
(Continued)

FOREIGN PATENT DOCUMENTS

CN    103995805 A    8/2014
CN    105871619 A    8/2016
(Continued)

OTHER PUBLICATIONS

International Search Report issued for Application No. PCT/CN2019/072081, dated Apr. 17, 2019, 4 pages.
(Continued)

*Primary Examiner* — Martin Lerner
(74) *Attorney, Agent, or Firm* — Seed IP Law Group LLP (57) ABSTRACT

Implementations of the present specification disclose methods, apparatuses, and devices for generating word vectors. The method includes: obtaining individual words by segmenting a corpus; establishing a feature vector of each word based on n-ary characters; training a recurrent neural network based on the feature vectors of the obtained words and feature vectors of context words associated with the obtained words in the corpus; and generating a word vector for each obtained word based on the feature vector of the obtained word and the trained recurrent neural network.

18 Claims, 5 Drawing Sheets

(51) Int. Cl.
*G06N 3/04* (2006.01)
*G06N 20/00* (2019.01)
*G06F 40/40* (2020.01)
*G06F 40/30* (2020.01)
*G06N 3/08* (2006.01)

(58) Field of Classification Search
USPC .................................. 704/1, 9; 706/16, 30
See application file for complete search history.

(56) References Cited

U.S. PATENT DOCUMENTS

| | | | | |
|---|---|---|---|---|
| 10,755,174 | B2* | 8/2020 | He | G06F 40/30 |
| 2007/0011110 | A1* | 1/2007 | Selvaraj | G06K 9/6269 |
| | | | | 706/12 |
| 2009/0157578 | A1* | 6/2009 | Sellamanickam | G06N 20/00 |
| | | | | 706/20 |
| 2015/0066496 | A1* | 3/2015 | Deoras | G10L 15/1815 |
| | | | | 704/232 |
| 2015/0095017 | A1* | 4/2015 | Mnih | G06F 40/242 |
| | | | | 704/9 |
| 2016/0232540 | A1* | 8/2016 | Gao | G06Q 30/0201 |
| 2016/0307098 | A1* | 10/2016 | Goel | G06N 3/0454 |
| 2017/0053646 | A1* | 2/2017 | Watanabe | G10L 15/22 |
| 2017/0091168 | A1* | 3/2017 | Bellegarda | G06F 40/274 |
| 2017/0200066 | A1* | 7/2017 | Wang | G06F 16/5846 |
| 2017/0365252 | A1* | 12/2017 | Ushio | G06F 40/30 |
| 2018/0018391 | A1* | 1/2018 | Kaji | G06F 16/353 |
| 2018/0210876 | A1* | 7/2018 | Cao | G06F 40/30 |
| 2018/0225553 | A1 | 8/2018 | Ha et al. | |
| 2018/0365231 | A1 | 12/2018 | Li et al. | |
| 2019/0087677 | A1* | 3/2019 | Wolf | G06F 16/5846 |
| 2019/0114348 | A1* | 4/2019 | Gao | G06F 16/24575 |
| 2019/0130573 | A1* | 5/2019 | Xu | G06N 3/0481 |
| 2020/0073933 | A1* | 3/2020 | Zhao | G06F 40/295 |
| 2020/0134262 | A1* | 4/2020 | Cao | G06F 40/53 |
| 2020/0202171 | A1* | 6/2020 | Hughes | G06N 20/00 |

FOREIGN PATENT DOCUMENTS

| | | |
|---|---|---|
| CN | 106547735 A | 3/2017 |
| CN | 107153642 A | 9/2017 |
| CN | 107273503 A | 10/2017 |
| JP | 2018-533148 A | 11/2018 |
| KR | 10-2017-0039951 A | 4/2017 |
| WO | 2017/057921 A1 | 4/2017 |

OTHER PUBLICATIONS

Written Opinion issued for Application No. PCT/CN2019/072081, dated Apr. 17, 2019, 4 pages.

* cited by examiner

GENERATING WORD VECTORS BY RECURRENT NEURAL NETWORKS BASED ON N-ARY CHARACTERS

CROSS-REFERENCE TO RELATED APPLICATIONS

This patent application is a continuation of PCT Application No. PCT/CN2019/072081, filed Jan. 17, 2019; which claims priority to Chinese Patent Application No. 201810113710.3, filed Feb. 5, 2018, entitled "METHODS, APPARATUSES, AND DEVICES FOR GENERATING WORD VECTORS," which are incorporated herein by reference in their entirety.

TECHNICAL FIELD

The present specification relates to the technical field of computer software, and in particular, to methods, apparatuses, and devices for generating word vectors.

BACKGROUND

Most of today's natural language processing solutions employ a neural network-based architecture in which an important underlying technology is word vector. A word vector is a vector that maps a word to a fixed number of dimensions, where the vector represents the semantic information of the word.

In existing technologies, commonly used algorithms for generating word vectors include, for example, Google's word vector algorithm, Microsoft's deep neural network algorithm, etc.

In view of the existing technologies, there is a need for more accurate solutions for generating word vectors.

SUMMARY

Implementations of the present specification provide methods, apparatuses, and devices for generating word vectors, to provide a more reliable solution for generating word vectors.

The implementations of the present specification provide the following solutions:

An implementation of the present specification provides a method for generating word vectors, including: obtaining individual words by segmenting a corpus; establishing a feature vector for each obtained word based on n-ary characters corresponding to the obtained word, each n-ary character representing n consecutive characters of a word corresponding to the n-ary character; training a recurrent neural network based on the feature vectors of the obtained words and the feature vectors of context words associated with each obtained word in the corpus; and generating a word vector for each obtained word based on the feature vector of the obtained word and the trained recurrent neural network.

An implementation of the present specification provides an apparatus for generating word vectors, including: an acquisition module, configured to obtain individual words by segmenting a corpus; an establishment module, configured to establish a feature vector for each obtained word based on n-ary characters corresponding to the obtained word, each n-ary character representing n consecutive characters of a word corresponding to the n-ary character; a training module, configured to train a recurrent neural network based on the feature vectors of the obtained words and the feature vectors of context words associated with each obtained word in the corpus; and a generation module, configured to generate a word vector for each obtained word based on the feature vector of the obtained word and the trained recurrent neural network.

An implementation of the present specification provides another method for generating word vectors, including:

Step 1: Establishing a vocabulary of words obtained by segmenting a corpus, where the obtained words exclude word(s) that appear for less than a predetermined or dynamically determined number of times in the corpus.

Step 2: Determining a total number of n-ary characters corresponding to all of the obtained words, where same n-ary characters are counted once, and each n-ary character represents n consecutive characters of an obtained word corresponding to the n-ary character.

Step 3: Establishing, for each obtained word, based on each n-ary character corresponding to the obtained word, a feature vector whose dimensionality is the total number, where each dimension of the feature vector corresponds to a different n-ary character, and the value of each dimension indicates whether a corresponding n-ary character is mapped to the obtained word corresponding to the feature vector.

Step 4: Traversing the corpus on which word segmentation is performed, and performing step 5 with respect to a current word accessed during the traversal, and if the traversal is completed, performing step 6; otherwise continuing the traversal.

Step 5: Using the current word as a center, sliding towards both sides for at most k words to establish a window, and using the words in the window except the current word as context words, and inputting a sequence formed by feature vectors of all the context words into a sequence representation layer of a recurrent neural network for recurrent calculation to obtain a first vector; inputting a feature vector of the current word and a feature vector of a negative sample word selected in the corpus into a full connection layer of the recurrent neural network for calculation to obtain a second vector and a third vector; and updating parameters of the recurrent neural network based on the first vector, the second vector, the third vector, and a specified loss function.

The recurrent calculation is performed according to the following formula:

$$s_t = \sigma(Ux_t + Ws_{t-1})$$

$$o_t = \text{softmax}(Vs_t)$$

The loss function includes:

$$l(w, c; U, W, V, \zeta, \tau) = \log\left(1 + \sum_{m=1}^{\lambda} \exp(-\gamma \cdot (s(w, c) - s(w'_m, c)))\right)$$

where $x_t$ indicates an input unit of the sequence representation layer at the time t, e.g., a feature vector of the $t+1^{th}$ context word associated with the current word; $s_t$ indicates a hidden unit of the sequence representation layer at the time t; $o_t$ indicates a vector obtained through recurrent calculation of the feature vectors of the first t+1 context words associated with the current word; U, W, and V indicate weight parameters of the sequence representation layer; $\sigma$ indicates an activation function; c indicates the first vector; w indicates the second vector; $w_m'$ indicates the third vector corresponding to the $m^{th}$ negative sample word; $\zeta$ indicates a weight parameter of the full connection layer; $\tau$ indicates an offset parameter of the full connection layer; $\gamma$ indicates a hyperparameter; s indicates a similarity calculation function; and λ indicates the number of negative sample words.

Step 6: Inputting the feature vector of each obtained word into the full connection layer of the trained recurrent neural network for calculation to obtain corresponding word vectors.

An implementation of the present specification provides a device for generating word vectors, including: at least one processor, and a memory communicatively connected to the at least one processor, where the memory stores instructions that can be executed by the at least one processor, and the instructions are executed by the at least one processor to enable the at least one processor to: obtain individual words by segmenting a corpus; establish a feature vector for each obtained word based on n-ary characters corresponding to the obtained word, each n-ary character representing n consecutive characters of a word corresponding to the n-ary character; train a recurrent neural network based on the feature vectors of the obtained words and the feature vectors of context words associated with each obtained word in the corpus; and generate a word vector for each obtained word based on the feature vector of the obtained word and the trained recurrent neural network.

The previously described at least one technical solution adopted in the implementations of the present specification can achieve the following beneficial effects: The recurrent neural network can depict the context and overall semantic information of the word through the recurrent calculation, and extract more context and semantic information, and the n-ary character can express the word on more finely, so that the word vector can be more accurately generated.

BRIEF DESCRIPTION OF DRAWINGS

To describe the technical solutions in the implementations of the present specification or in the existing technologies more clearly, the following is a brief introduction of the accompanying drawings for illustrating such technical solutions. Clearly, the accompanying drawings described below are merely some implementations of the present specification, and a person skilled in the art can derive other drawings from such accompanying drawings without making innovative efforts.

DESCRIPTION OF IMPLEMENTATIONS

Implementations of the present specification provide methods, apparatuses, and devices for generating word vectors.

To enable a person skilled in the art to better understand technical solutions in the present specification, the following clearly and completely describes the technical solutions in the implementations of the present specification with reference to the drawings that accompany the implementations. Clearly, the described implementations are merely some rather than all of the implementations of the present application. Based on the implementations of the present specification, all other implementations obtained by a person of ordinary skill in the art without making innovative efforts shall fall within the protection scope of the present application.

Figure 1:
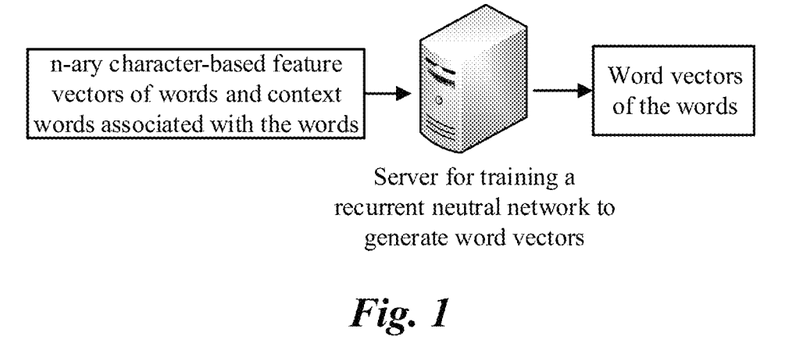
FIG. 1 is a schematic diagram illustrating an overall architecture involved in an actual application scenario of solutions of the present specification.

FIG. 1 is a schematic diagram of an overall architecture involved in an actual application scenario of solutions of the present specification. The overall architecture relates primarily to a server that is used to train a recurrent neural network to generate word vectors. A feature vector of each word can be established based on an n-ary character, and a recurrent neural network can be trained based on the feature vectors and the context of the words. The feature vectors can be established by the server or another device.

The solutions of the present specification are applicable to languages that are formed by alphabetic letters, such as English, French, German, and Spanish, and are also applicable to languages that are formed by non-alphabetic elements but can be easily mapped to alphabetic letters, such as Chinese (which can be mapped to pinyin letters) and Japanese (which can be mapped to Roman letters). For ease of description, in the following implementations, the solutions of the present specification are mainly described with respect to scenarios of English.

Figure 2:
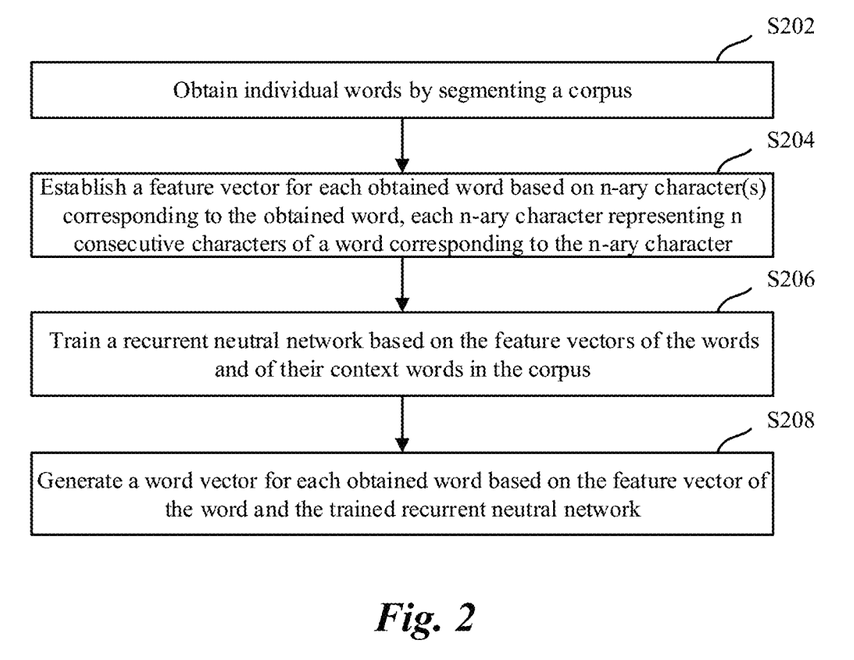
FIG. 2 is a schematic flowchart illustrating a method for generating word vectors, according to some implementations of the present specification.

FIG. 2 is a schematic flowchart illustrating a method for generating word vectors, according to some implementations of the present specification. From the perspective of a device, an actor that executes the process includes, for example, at least one of a personal computer, a large- or medium-sized computer, a computer cluster, a mobile phone, a tablet computer, a smart wearable device, a vehicle, etc.

The process in FIG. 2 can include the following steps:

S202: Obtain individual words by segmenting a corpus.

In some implementations of the present specification, more specifically, the words obtained can be at least some of the words that appear at least once in the corpus. To facilitate subsequent processing, each word can be stored in a vocabulary, and individual words can be read from the vocabulary for use.

It is worthwhile to note that, considering that if a word appears too few times in the corpus, the number of corresponding iterations in the subsequent processing is also small, and the training result reliability is relatively low, such a word can be screened out. In this case, more specifically, the obtained words are some words out of all the words that appear at least once or a specified number of times in the corpus. The specified number can be manually defined, or automatically determined based on a frequency distribution of words that appear in the corpus.

S204: Establish a feature vector for each obtained word based on respective n-ary character(s) corresponding to each word, each n-ary character representing n consecutive characters of a word corresponding to the n-ary character.

In this implementation of the present specification, characters of a word can include the characters constituting the word, or other characters to which the characters constituting the word are mapped. For example, the word "boy" includes characters "b", "o", and "y".

To express the order of words, some mark character(s) can be added to the original word(s) based on certain rules, and these mark character(s) can also be considered characters of the word(s). For example, a mark character can be added to a position such as a start position and/or an end position of the original word, and after such marking, the word "boy" can take the form of "# boy #", and the two "#" can be considered characters of the word "boy".

Further, n is an integer not less than 1. Use "# boy #" as an example, the word includes the following 3-ary characters: "# bo" (the 1st to 3rd characters), "boy" (the 2nd to 4th characters), and "oy #" (the 3rd to 5th characters); and includes the following 4-ary characters: "# boy" (the 1st to 4th characters) and "boy #" (the 2nd to 5th characters).

In some implementations of the present specification, the value of n can be dynamically adjusted. For the same word, at the time of determining the n-ary character corresponding to the word, n can have a single value, e.g., n=3 means that only 3-ary characters corresponding to the word are determined, or multiple values, e.g., n=3, 4 means both 3-ary characters and 4-ary characters corresponding to the word are determined.

To facilitate computer processing, n-ary characters can be represented based on specified codes (e.g., numbers). For example, different characters or different n-ary characters can be represented by different codes or code strings.

In some implementations of the present specification, the feature vector of a word can have values assigned to different dimensions to indicate the n-ary characters corresponding to the word. More precisely, the feature vector of the word can also be used to indicate the order of the n-ary characters corresponding to the word.

S206: Train a recurrent neural network based on the feature vectors of the words and of their context words in the corpus.

In some implementations of the present specification, the sequence representation layer of the recurrent neural network is used to process the sequence to obtain the global information of the sequence, and the content of the global information is affected by the order of the elements in the sequence. Specifically, in the context of the present specification, a sequence includes feature vectors of each context word associated with a current word, e.g., each individual word as obtained can be used as a current word, as elements, and global information can refer to overall semantics of all context words associated with the current word.

S208: Generate a word vector for each obtained word based on the feature vector of the word and the trained recurrent neural network.

By training the recurrent neural network, appropriate parameters can be determined for the recurrent neural network, so that the recurrent neural network can more accurately depict the overall semantics of the context words and the corresponding semantics of the current words. The parameters include, for example, weight parameters and offset parameters.

The word vector can be obtained by making inference(s) from the feature vector based on the trained recurrent neural network.

By using the method in FIG. 2, the recurrent neural network can depict the overall semantic information of the context of the word through recurrent calculation, extract more semantic information of the context, and the n-ary character(s) can express the word more finely, so that the word vector can be more accurately generated.

Based on the method shown in FIG. 2, some implementations of the present specification further provides some implementations solutions of the method, as well as extension solutions, which are described below.

In some implementations of the present specification, for step S204, the establishing of a feature vector for each word based on the n-ary character(s) corresponding to the word can specifically include:

determining a total number of distinct n-ary characters in a collection of respective n-ary characters corresponding to each of the obtained words; and establishing, for each word, a feature vector whose dimensionality is determined based on the total number, where the feature vector can be assigned values to different dimensions to indicate the n-ary characters corresponding to the word.

For example, all of the n-ary characters corresponding to each and every obtained word are indexed starting from 0 at an increment of 1. The same n-ary characters have the same index number. Assuming that the total number is $N_c$, then the index number of the last n-ary character is $N_c-1$. A feature vector whose dimension is $N_c$ is established for each word. Specifically, assuming that n=3, and that the indexes of all the 3-ary characters corresponding to a word are 2, 34, and 127, then the $2^{nd}$, the $34^{th}$, and the $127^{th}$ elements in the feature vector established for that word can be 1, and the remaining elements are 0. Using the same example, in some embodiments, the values assigned to the $2^{nd}$, the $34^{th}$, and the $127^{th}$ elements in the feature vector can be different from one another, to reflect different weights or to indicate an order of the 3-ary characters corresponding to the word.

Figure 3:
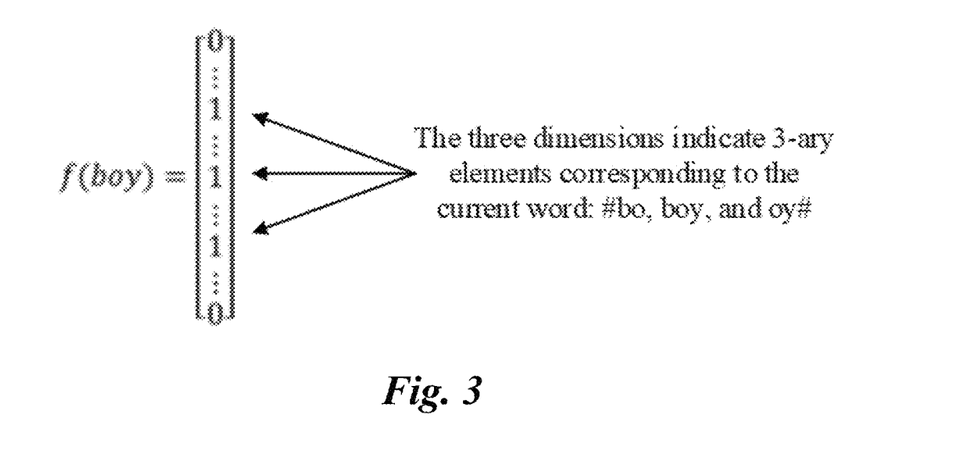
FIG. 3 is a schematic diagram illustrating a feature vector of an English word in an application scenario, according to some implementations of the present specification.

More intuitively, based on the above example, this implementation of the present specification provides a schematic diagram illustrating a feature vector of an English word in an application scenario, as shown in FIG. 3. The English word is "boy", and a mark character "#" is added at the start position and the end position. f indicates the process of establishing a feature vector based on the word. The feature vector is, for example, a column vector that is established based on each 3-ary character of "boy". It can be seen that, the values of three elements in the feature vector are 1s, which respectively indicate the 3-ary characters "# bo", "boy", and "oy #"; and the values of other elements are 0s, which indicates that "boy" does not correspond to any other 3-ary character.

In this implementation of the present specification, when the recurrent neural network is trained, the goal is to ensure that the similarity between the feature vectors of the current word and its context word(s) to be relatively high after inferences made based on the trained recurrent neural network.

Further, the context word(s) is regarded as positive sample word(s), and, as a contrast, one or more negative sample words associated with the current word can be selected based on certain rule(s) to be involved in the training, so as to ensure fast training convergence and obtain more accurate training results. In this case, the goal can further include ensuring that the similarity between the feature vectors of the current word and the negative sample word(s) to be relatively low after inferences made based on the trained recurrent neural network. Negative sample words can be selected randomly in the corpus, or selected in the non-context words, etc. The present specification does not limit the specific ways of calculating such similarity. For example, the similarity can be calculated based on a cosine operation of the angle between vectors, the similarity can be calculated based on the square sum operation of the vectors, etc.

According to the above analysis, for step S206, the recurrent neural network is trained based on the feature vectors of the obtained words as well as the feature vectors of their context words in the corpus. Specifically, the training can include:

training the recurrent neural network based on the feature vectors of the obtained words as well as the feature vectors of their context words and their negative sample words in the corpus.

In some implementations of the present specification, the training process of the recurrent neural network can be iteratively performed. A relatively simple way is to traverse the corpus after word segmentation, and each time one of the obtained words is accessed, an iteration is performed, until the traversal is complete. The recurrent neural network can then be considered to have been trained using the corpus.

Specifically, the training of the recurrent neural network based on the feature vectors of the obtained words and the feature vectors of their context words and negative sample words in the corpus can include:

traversing the corpus after word segmentation, and executing the following for a current word accessed during the traversal (the content of this execution corresponds to a process during one iteration):

for a current word obtained after word segmentation, determining one or more context words and negative sample words in the corpus; inputting a sequence formed by feature vector(s) of the context word(s) of the current word into a sequence representation layer of a recurrent neural network for recurrent calculation to obtain a first vector; inputting a feature vector of the current word into the full connection layer of the recurrent neural network for calculation to obtain a second vector, and inputting a feature vector of a negative sample word associated with the current word into the full connection layer of the recurrent neural network for calculation to obtain a third vector; and updating parameters of the recurrent neural network based on the first vector, the second vector, the third vector, and a specified loss function.

Figure 4:
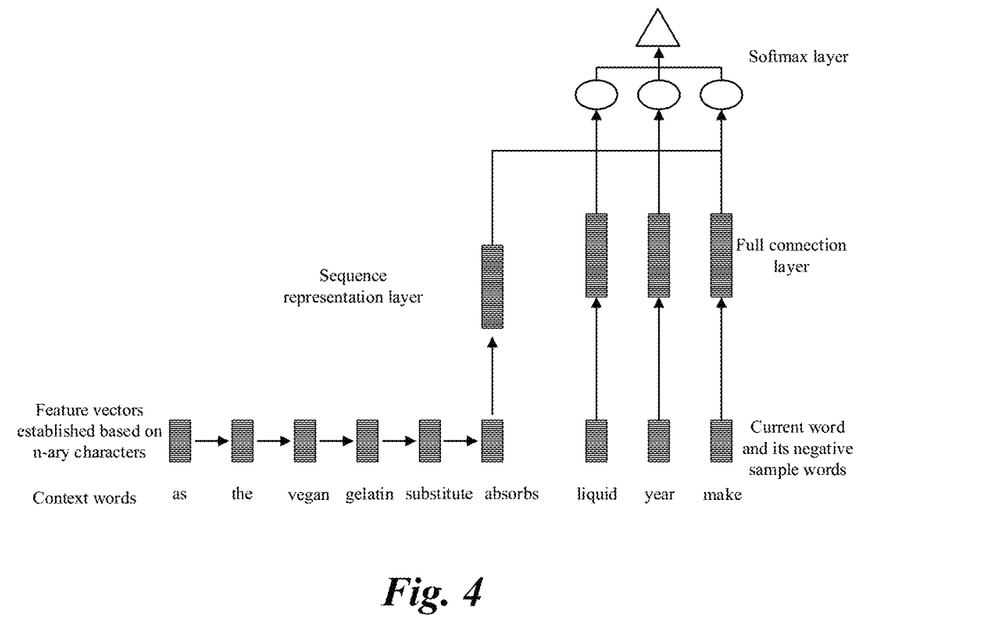
FIG. 4 is a schematic flowchart illustrating a principle of a method for generating word vectors based on a recurrent neural network in an actual application scenario, according to some implementations of the present specification.

More intuitively, the above process is described with reference to FIG. 4. FIG. 4 is a schematic flowchart illustrating a principle of a method for generating word vectors based on a recurrent neural network in an actual application scenario, according to some implementations of the present specification.

The recurrent neural network in FIG. 4 mainly includes a sequence representation layer, a full connection layer, and a Softmax layer. In the process of training the recurrent neural network, the feature vector of the context word(s) is processed by the sequence presentation layer to extract the semantic information of the context word(s) as a whole, and the feature vector of the current word and its negative sample word(s) can be processed by the full connection layer. Detailed description is provided below.

In this implementation of the present specification, it is assumed that a sliding window is used to determine a context word, the center of the sliding window is the current word being accessed during the traversal, and the words in the sliding window other than the current word are context words. The feature vectors of all the context words (the feature vector of each context word is one element in the sequence as described above) are sequentially inputted to the sequence representation layer, and then recurrent calculation can be performed according to the following formula:

$$s_t = \sigma(Ux_t + Ws_{t-1})$$

$$o_t = \text{softmax}(Vs_t)$$

where $x_t$ indicates the input unit of the sequence representation layer at the time t, e.g., the feature vector of the $t+1^{th}$ context word; $s_t$ indicates the hidden unit of the sequence representation layer at the time t; $o_t$ indicates a vector obtained through recurrent calculation of the feature vectors of the first t+1 context words; U, W, and V indicate weight parameters of the sequence representation layer; $\sigma$ indicates an activation function, such as a tan h function or a ReLu function. The subscript of the parameter in the formula can start from 0.

Figure 5:
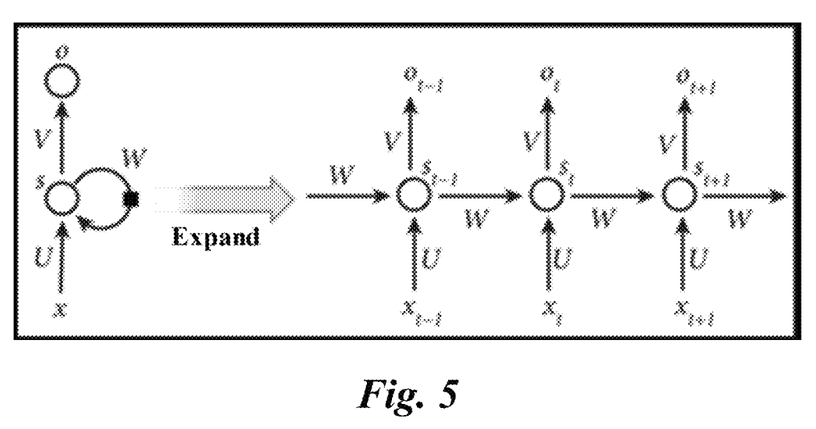
FIG. 5 is a schematic structural diagram illustrating a sequence representation layer of a recurrent neural network, according to some implementations of the present specification.

To facilitate understanding of the formula used for recurrent calculation, some implementations of the present specification further provides a schematic structural diagram illustrating a sequence representation layer of a recurrent neural network, as shown in FIG. 5.

On the left side of FIG. 5, x indicates an input unit of a sequence representation layer; s indicates a hidden unit of the sequence representation layer; o indicates an output unit of the sequence representation layer; the hidden unit processes input data by using an activation function, and the output unit processes input data by using the softmax function. The data calculated and output by the hidden unit at a previous time is fed back to the input of the hidden unit at a next time with a certain weight, so that the content of the entire sequence is reflected in the final output data of the sequence representation layer; U indicates a weight parameter from the input unit to the hidden unit; W indicates a weight parameter for feeding back from the hidden unit to the hidden unit at the next time; and V indicates a weight parameter from the hidden unit to the output unit.

On the right side of FIG. 5, the structure on the left side is expanded to illustrate the structure of the sequence input layer at 3 consecutive points of time and the principle for processing the sequential input of 3 elements. It can be seen that, at the t-1 time, the data that is output following computation by the hidden unit is denoted as $s_{t-1}$; at the t time, the feature vector $x_t$ of the $t^{th}$ context word associated with the current word is the input, and the data that is output following computation by the hidden unit is denoted as $s_t = \sigma(Ux_t + Ws_{t-1})$, and the data that is output by the output unit is denoted as $o_t = \text{softmax}(Vs_t)$; at the t+1 time, the feature vector $x_{t+1}$ of the $t+1^{th}$ context word associated with the current word is the input, and the data that is output following computation by the hidden unit is denoted as $s_{t+1} = \sigma(Ux_{t+1} + Ws_t)$, and the data that is output by the output unit is denoted as $o_{t+1} = \text{softmax}(Vs_{t+1})$. By analogy and extension, after the feature vector of the last context word associated with the current word is input, a corresponding first vector can be output.

FIG. 4 also exemplarily illustrates the current word "liquid" in a corpus, 6 context words "as", "the", "vegan", "gelatin", "substitute", and "absorbs" of the current word in the corpus, and 2 negative sample words "year" and "make" of the current word in the corpus. FIG. 4 shows the output unit corresponding to the last context word "absorbs" at the sequence representation layer, where the output unit outputs a first vector corresponding to the current word "liquid".

The feature vector of the current word can be input to the full connection layer, and can be calculated according to, for example, the following formula:

$$w = \sigma(\zeta \cdot q + \tau)$$

where w indicates the second vector that is output by the full connection layer after processing the feature vector of the current word; ζ indicates the weight parameter of the full connection layer; q indicates the feature vector of the current word; and τ indicates the offset parameter of the full connection layer.

Similarly, for each negative sample word, a respective feature vector can be input to the full connection layer and processed in a way as the current word is processed, to obtain a third vector, and the third vector corresponding to the $m^{th}$ negative sample word is denoted as $w_m'$. In other words, multiple third vectors can be obtained and each third vector is generated based on a different negative sample word associated with the current word.

Further, the updating of parameters of the recurrent neural network based on the first vector, the second vector, the third vector(s), and a specified loss function can include, for example, calculating a first similarity between the second vector and the first vector, and a second similarity between the third vector and the first vector; and updating parameters of the recurrent neural network based on the first similarity, the second similarity, and the specified loss function.

A loss function is used as an example. The loss function can be, for example:

$$l(w, c; U, W, V, \zeta, \tau) = \log\left(1 + \sum_{m=1}^{\lambda} \exp(-\gamma \cdot (s(w, c) - s(w_m', c)))\right)$$

where c indicates the first vector; w indicates the second vector; $w_m'$ indicates the third vector corresponding to the $m^{th}$ negative sample word; U, W, and V indicate weight parameters of the sequence representation layer; ζ indicates a weight parameter of the full connection layer; τ indicates an offset parameter of the full connection layer; γ indicates a hyperparameter; s indicates a similarity calculation function; and λ indicates the number of negative sample words.

In practice, if no negative sample word is used, the term for calculating the similarity between the first vector and the third vector(s) can be removed from the loss function used.

In some implementations of the present specification, after training of the recurrent neural network, a word vector can be generated by making inference(s) from the feature vector. Specifically, for step S208, the generating of a word vector for each word based on the feature vector of each word and the trained recurrent neural network can specifically include:

inputting the feature vector of each obtained word into the full connection layer of the trained recurrent neural network for calculation to obtain a vector output, which is considered a corresponding word vector.

Figure 6:
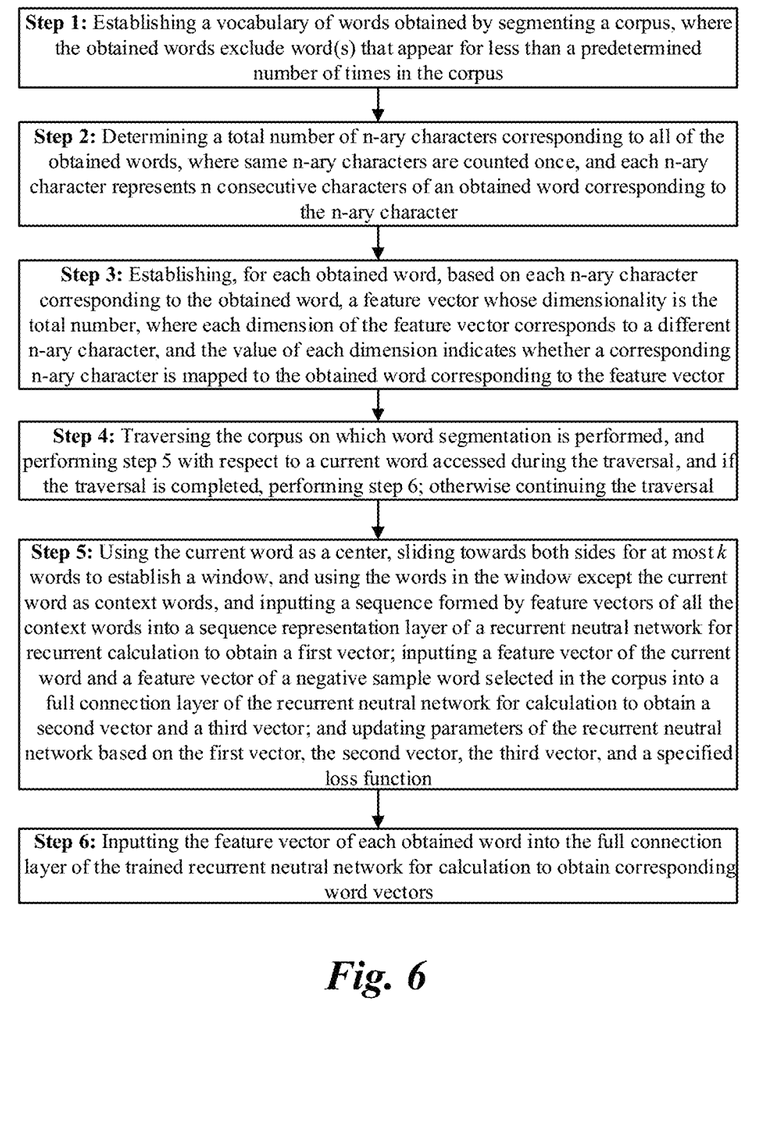
FIG. 6 is a schematic flowchart illustrating another method for generating word vectors, according to some implementations of the present specification.

Based on the same idea, some implementations of the present specification provide another method for generating word vectors, which is an example implementation of the method for generating word vectors in FIG. 2. FIG. 6 is a schematic flowchart illustrating such a method for generating word vectors.

The process in FIG. 6 includes following steps:

Step 1: Establishing a vocabulary of words obtained by segmenting a corpus, where the words do not include a word that occurs less than a predetermined or dynamically determined number of times in the corpus; go to step 2;

Step 2: Determining a total number of n-ary characters corresponding to each of the obtained words, where the same n-ary characters are counted only once, and each n-ary character represents n consecutive characters of a word corresponding to the n-ary character; go to step 3;

Step 3: Establishing, based on the n-ary character(s) corresponding to each word, a feature vector whose dimension is the total number described above, where each dimension of the feature vector corresponds to a different n-ary character, and the value of each dimension indicates whether its corresponding n-ary character is mapped to the word corresponding to the feature vector.

Step 4: Traversing the corpus on which word segmentation is performed, and performing step 5 on the current word being accessed during the traversal, and if the traversal is completed, performing step 6; otherwise continuing the traversal.

Step 5: Taking the current word as a center, sliding towards both sides for at most k words to establish a window, and using the words in the window except the current word as context words, and inputting a sequence formed by feature vectors of all the context words into a sequence representation layer of a recurrent neural network for recurrent calculation to obtain a first vector; inputting the feature vector of the current word and the feature vector of a negative sample word selected in the corpus into a full connection layer of the recurrent neural network for calculation to obtain a second vector and a third vector; and updating parameters of the recurrent neural network based on the first vector, the second vector, the third vector, and a specified loss function.

The recurrent calculation is performed according to the following formula:

$$s_t = \sigma(Ux_t + Ws_{t-1})$$

$$o_i = \text{softmax}(Vs_i)$$

The loss function includes:

$$l(w, c; U, W, V, \zeta, \tau) = \log\left(1 + \sum_{m=1}^{\lambda} \exp(-\gamma \cdot (s(w, c) - s(w_m', c)))\right)$$

where $x_t$ indicates an input unit of the sequence representation layer at time t, e.g., the feature vector of the $t+1^{th}$ context word associated with the current word; $s_t$ indicates a hidden unit of the sequence representation layer at the time t; $o_t$ indicates a vector obtained through recurrent calculation based on the feature vectors of the first t+1 context words associated with the current word; U, W, and V indicate weight parameters of the sequence representation layer; σ indicates an activation function; c indicates the first vector; w indicates the second vector; $w_m'$ indicates the third vector corresponding to the $m^{th}$ negative sample word; ζ indicates a weight parameter of the full connection layer; τ indicates an offset parameter of the full connection layer; γ indicates a hyperparameter; s indicates a similarity calculation function; and λ indicates the number of negative sample words.

Step 6: Inputting the feature vector of each obtained word into the full connection layer of the trained recurrent neural network for calculation to obtain corresponding word vectors.

The steps in this method for generating word vectors can be performed by same or different modules, which are not specifically limited in the present specification.

The foregoing has described the method for generating word vectors according to some implementations of the present specification. Based on the same idea, some implementations of the present specification further provide a corresponding apparatus, as shown in FIG. 7.

Figure 7:
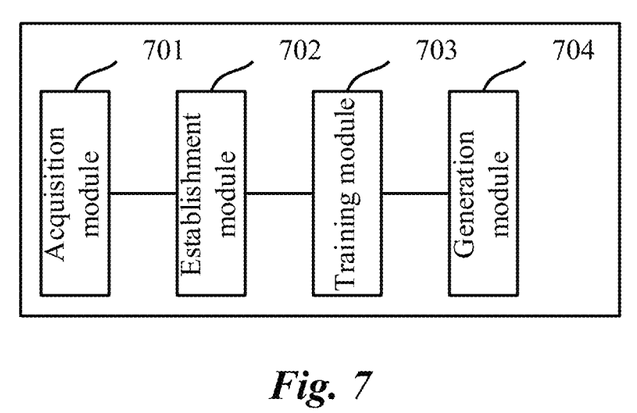
FIG. 7 is a schematic structural diagram illustrating an apparatus for generating word vectors corresponding to FIG. 2, according to some implementations of the present specification.

FIG. 7 is a schematic structural diagram illustrating an apparatus for generating word vectors corresponding to FIG. 2, according to some implementations of the present specification. The apparatus can be located in the entity to execute the process in FIG. 2 and includes:

an acquisition module 701, configured to obtain individual words by segmenting a corpus;

an establishment module 702, configured to establish a feature vector for each word based on n-ary character(s) corresponding to each word, each n-ary character representing n consecutive characters of the word corresponding to the n-ary character;

a training module 703, configured to train a recurrent neural network based on the feature vectors of the obtained words and the feature vectors of context words associated with each obtained word in the corpus; and a generation module 704, configured to generate a word vector for each word based on the feature vector of each word and the trained recurrent neural network.

Optionally, characters of a word include each character constituting the word and mark characters added to a start position and/or an end position of the word.

Optionally, the establishment module 702's establishing of a feature vector for each obtained word based on n-ary characters corresponding to the obtained word specifically includes:

determining, by the establishment module 702, a total number of distinct n-ary characters in a collection of respective n-ary characters corresponding to each of the obtained words; and establishing, for each obtained word, a feature vector whose dimensionality is determined based on the total number, where the feature vector can be assigned values to its different dimensions to indicate n-ary characters corresponding to the obtained word.

Optionally, the training module 703's training of the recurrent neural network based on the feature vectors of the words and the feature vectors of the context words of the words in the corpus specifically includes:

training, by the training module 703, the recurrent neural network based on the feature vectors of the words and the feature vectors of the context words and the negative sample words of the words in the corpus.

Optionally, the training module 703's training of the recurrent neural network based on the feature vectors of the words and the feature vectors of the context words and the negative sample words of the words in the corpus specifically includes:

traversing, by the training module 703, the corpus after word segmentation, and executing the following when a current word is accessed during the traversal:

determining one or more context words and negative sample words associated with the current word in the corpus after word segmentation;

inputting a sequence formed by feature vectors of the context words associated with the current word into a sequence representation layer of the recurrent neural network for recurrent calculation to obtain a first vector;

inputting a feature vector of the current word into the full connection layer of the recurrent neural network for calculation to obtain a second vector, and inputting a feature vector of a negative sample word associated with the current word into the full connection layer of the recurrent neural network for calculation to obtain a third vector; and updating parameters of the recurrent neural network based on the first vector, the second vector, the third vector, and a specified loss function.

Optionally, the training module 703's performing of recurrent calculation specifically includes:

performing, by the training module 703, the recurrent calculation according to the following formula:

$$s_t = \sigma(Ux_t + Ws_{t-1})$$

$$o_t = \text{softmax}(Vs_t)$$

where $x_t$ indicates an input unit of the sequence representation layer at the time t, e.g., a feature vector of the $t+1^{th}$ context word associated with the current word; $s_t$ indicates a hidden unit of the sequence representation layer at the time t; $o_t$ indicates a vector obtained through recurrent calculation of the feature vectors of the first t+1 context words associated with the current word; U, W, and V indicate weight parameters of the sequence representation layer; and $\sigma$ indicates an activation function.

Optionally, the training module 703's updating of parameters of the recurrent neural network based on the first vector, the second vector, the third vector, and a specified loss function specifically includes:

calculating, by the training unit 703, a first similarity between the second vector and the first vector, and a second similarity between the third vector and the first vector; and updating parameters of the recurrent neural network based on the first similarity, the second similarity, and the specified loss function.

Optionally, the loss function specifically includes:

$$l(w, c; U, W, V, \zeta, \tau) = \log\left(1 + \sum_{m=1}^{\lambda} \exp\left(-\gamma \cdot (s(w, c) - s(w'_m, c))\right)\right)$$

where c indicates the first vector; w indicates the second vector; $w_m'$ indicates the third vector corresponding to the $m^{th}$ negative sample word; U, W, and V indicate weight parameters of the sequence representation layer; $\zeta$ indicates a weight parameter of the full connection layer; $\tau$ indicates an offset parameter of the full connection layer; $\gamma$ indicates a hyperparameter; s indicates a similarity calculation function; and $\lambda$ indicates the number of negative sample words.

Optionally, the generation module 704's generating of a word vector for each obtained word based on the feature vector of the obtained word and the trained recurrent neural network specifically includes:

inputting, by the generation module 704, the feature vector of each obtained word into the full connection layer of the trained recurrent neural network for calculation to obtain a vector output after calculation as a corresponding word vector.

Based on the same idea, some implementations of the present specification further provide a device for generating word vectors, including: at least one processor, and a memory communicatively connected to the at least one processor, where the memory stores instructions that can be executed by the at least one processor, and the instructions are executed by the at least one processor to enable the at least one processor to: obtain individual words by segmenting a corpus; establish a feature vector for each obtained word based on n-ary characters corresponding to the obtained word, each n-ary character representing n consecutive characters of a word corresponding to the n-ary character; train a recurrent neural network based on the feature vectors of the obtained words and the feature vectors of context words associated with each obtained word in the corpus; and generate a word vector for each obtained word based on the feature vector of the obtained word and the trained recurrent neural network.

Based on the same idea, some implementations of the present specification further provide a non-volatile computer storage medium, where the storage medium stores computer executable instructions that are used to: obtain individual words by segmenting a corpus; establish a feature vector for each obtained word based on n-ary characters corresponding to the obtained word, each n-ary character representing n consecutive characters of a word corresponding to the n-ary character; train a recurrent neural network based on the feature vectors of the obtained words and the feature vectors of context words associated with each obtained word in the corpus; and generate a word vector for each obtained word based on the feature vector of the obtained word and the trained recurrent neural network.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The implementations of the present specification are described in a progressive way. For the same or similar parts of the implementations, mutual references can be made to the implementations. Each implementation focuses on a difference from the other implementations. In particular, for implementations of an apparatus, a device, and a non-volatile computer storage medium, because implementations of an apparatus, a device, and a non-volatile computer storage medium are basically similar to method implementation, description is relatively simple, and references can be made to parts of the method implementation descriptions.

The apparatus, device, and non-volatile computer storage medium provided in the implementations of the present specification correspond to the method(s). Therefore, the apparatus, device, and non-volatile computer storage medium also have beneficial technical effects that are similar to those of corresponding method. Because the beneficial technical effects of the method(s) have been described in detail above, the beneficial technical effects of the corresponding apparatus, device, and non-volatile computer storage medium details are omitted here for simplicity.

In the 1990s, whether technology improvement was hardware improvement (for example, improvement of a circuit structure, such as a diode, a transistor, or a switch) or software improvement (improvement of a method procedure) could be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. Specifically, a computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For convenience of description, the above devices are described separately in terms of their functions. Certainly, functions of the units can be implemented in the same or different software or hardware when the present specification is implemented.

A person skilled in the art should understand that the implementations of the present specification can be provided as methods, systems, or computer program products. Therefore, the implementations of the present specification can take a form of complete hardware implementations, complete software implementations, or implementations combining software and hardware aspects. Further, the implementations of the present specification can take a form of a computer program product implemented on one or more computer-usable storage media (including but not limited to disk storage, CD-ROM, and optical storage.) containing computer-usable program code.

The present specification is described with reference to at least one of a flowchart or block diagram of the method, device (system), and computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include", "comprise" or any other variant thereof is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that the implementations of the present specification can be provided as methods, systems or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification can be described in the general context of computer executable instructions executed by a computer, for example, a program module. Generally, the program module includes a routine, a program, an object, a component, a data structure, etc., executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The above descriptions are merely examples of the present specification and are not intended to limit the present application. For a person skilled in the art, the present application can be subject to various modifications and variations. Any modification, equivalent replacement or improvement made within spirit and principles of the present application shall be included in claims of the present application.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for generating word vectors, comprising:
obtaining individual words by segmenting a corpus;
establishing a feature vector for each obtained word based, at least in part, on one or more n-ary characters corresponding to the obtained word, each n-ary character representing n consecutive characters of a word;
training a recurrent neural network based, at least in part, on the feature vectors of the obtained words and feature vectors of context words associated with each obtained word in the corpus by:
traversing the corpus after word segmentation, and performing the following actions in response a current word being accessed during the traversal:
determining one or more context words and negative sample words associated with the current word in the corpus;
inputting a sequence formed by feature vectors of the context words associated with the current word into a sequence representation layer of the recurrent neural network to obtain a first vector;
inputting a feature vector of the current word into a full connection layer of the recurrent neural network to obtain a second vector; and
inputting a feature vector of a negative sample word associated with the current word into the full connection layer of the recurrent neural network to obtain a third vector; and
updating parameters of the recurrent neural network based, at least in part, on the first vector, the second vector, the third vector, and a loss function, wherein the loss function includes at least a weight parameter of the sequence representation layer, a weight parameter of the full connection layer, an offset parameter of the full connection layer, a hyperparameter, and a similarity calculation function; and
generating a word vector for each obtained word based, at least in part, on the feature vector of the obtained word and the trained recurrent neural network.

2. The method according to claim 1, wherein characters of an obtained word comprise each character constituting the obtained word and one or more mark characters added to a start position and/or an end position of the obtained word.

3. The method according to claim 1, wherein establishing the feature vector for each obtained word based, at least in part, on one or more n-ary characters corresponding to the obtained word comprises:
determining a total number of distinct n-ary characters in a collection of respective n-ary characters corresponding to each of the obtained words; and
establishing, for each obtained word, a feature vector whose dimensionality is determined based, at least in part, on the total number.

4. The method according to claim 3, wherein a number of dimensions of the feature vector is the total number.

5. The method according to claim 3, wherein values are assigned to individual dimensions of the feature vector to indicate a mapping between n-ary characters and the obtained word.

6. The method according to claim 1, further comprising performing recurrent calculation using the sequence representation layer of the recurrent neural network based on at least a hidden unit and an activation function.

7. The method according to claim 1, wherein updating the parameters of the recurrent neural network based on the first vector, the second vector, the third vector, and the loss function comprises:
calculating a first similarity between the second vector and the first vector, and a second similarity between the third vector and the first vector; and
updating parameters of the recurrent neural network based, at least in part, on the first similarity, the second similarity, and the loss function.

8. The method according to claim 1, wherein generating a word vector for each obtained word based, at least in part, on the feature vector of the obtained word and the trained recurrent neural network specifically comprises:
inputting the feature vector of each obtained word into the full connection layer of the trained recurrent neural network to obtain a vector output.

9. An apparatus for generating word vectors, comprising:
an acquisition module, configured to obtain individual words by segmenting a corpus;
an establishment module, configured to establish a feature vector for each obtained word based, at least in part, on one or more n-ary characters corresponding to the obtained word, each n-ary character representing n consecutive characters of a word;
a training module, configured to train a recurrent neural network based, at least in part, on the feature vectors of the obtained words and feature vectors of context words associated with each obtained word in the corpus by:
traversing the corpus after word segmentation, and performing the following actions in response to a current word being accessed during the traversal:
determining one or more context words and negative sample words associated with the current word in the corpus;
inputting a sequence formed by feature vectors of the context words associated with the current word into a sequence representation layer of the recurrent neural network to obtain a first vector;
inputting a feature vector of the current word into a full connection layer of the recurrent neural network to obtain a second vector; and
inputting a feature vector of a negative sample word associated with the current word into the full connection layer of the recurrent neural network to obtain a third vector; and
updating parameters of the recurrent neural network based, at least in part, on the first vector, the second vector, the third vector, and a loss function, wherein the loss function includes at least a weight parameter of the sequence representation layer, a weight parameter of the full connection layer, an offset parameter of the full connection layer, a hyperparameter, and a similarity calculation function; and
a generation module, configured to generate a word vector for each obtained word based, at least in part, on the feature vector of the obtained word and the trained recurrent neural network.

10. The apparatus according to claim 9, wherein characters of an obtained word comprise each character constituting the obtained word and one or more mark characters added to a start position and/or an end position of the obtained word.

11. The apparatus according to claim 9, wherein the establishment module is further configured to establish a feature vector for each obtained word based, at least in part, on n-ary characters corresponding to the obtained word by:

determining, by the establishment module, a total number of distinct n-ary characters in a collection of respective n-ary characters corresponding to each of the obtained words; and establishing, for each obtained word, a feature vector whose dimensionality is determined based, at least in part, on the total number.

12. The apparatus according to claim 11, wherein a number of dimensions of the feature vector is the total number.

13. The apparatus according to claim 12, wherein values are assigned to individual dimensions of the feature vector to indicate a mapping between n-ary characters and the obtained word.

14. The apparatus according to claim 9, wherein the training module is further configured to perform one or more recurrent calculations according to the following formula:

$$s_t = \sigma(Ux_t + Ws_{t-1})$$

$$o_t = \text{softmax}(Vs_t)$$

wherein $x_t$ indicates an input unit of the sequence representation layer at the time t, that is, a feature vector of the $t+1^{th}$ context word associated with the current word; $s_t$ indicates a hidden unit of the sequence representation layer at the time t; $o_t$ indicates a vector obtained through recurrent calculation of the feature vectors of the first t+1 context words associated with the current word; U, W, and V indicate weight parameters of the sequence representation layer; and $\sigma$ indicates an activation function.

15. The apparatus according to claim 9, wherein updating the parameters of the recurrent neural network based, at least in part, on the first vector, the second vector, the third vector, and the loss function comprises:

calculating, by the training unit, a first similarity between the second vector and the first vector, and a second similarity between the third vector and the first vector; and updating the parameters of the recurrent neural network based, at least in part, on the first similarity, the second similarity, and the loss function.

16. The apparatus according to claim 9, wherein the loss function comprises:

$$l(w, c; U, W, V, \zeta, \tau) = \log\left(1 + \sum_{m=1}^{\lambda} \exp(-\gamma \cdot (s(w, c) - s(w'_m, c)))\right)$$

wherein c indicates the first vector; w indicates the second vector; $w_m'$ indicates the third vector corresponding to the $m^{th}$ negative sample word; U, W, and V indicate weight parameters of the sequence representation layer; $\zeta$ indicates a weight parameter of the full connection layer; $\tau$ indicates an offset parameter of the full connection layer; $\gamma$ indicates a hyperparameter; s indicates a similarity calculation function; and $\lambda$ indicates a number of negative sample words.

17. The apparatus according to claim 9, wherein the generation module is further configured to generate a word vector for each obtained word based, at least in part, on the feature vector of the obtained word and the trained recurrent neural network by:

inputting, by the generation module, the feature vector of each obtained word into the full connection layer of the trained recurrent neural network to obtain a vector output.

18. An apparatus for generating word vectors, comprising:
at least one processor, and
a memory communicatively connected to the at least one processor, wherein the memory stores instructions that are executed by the at least one processor to cause the at least one processor to implement:
an acquisition module, configured to obtain individual words by segmenting a corpus;
an establishment module, configured to establish a feature vector for each obtained word based, at least in part, on one or more n-ary characters corresponding to the obtained word, each n-ary character representing n consecutive characters of a word;
a training module, configured to train a recurrent neural network based, at least in part, on the feature vectors of the obtained words and feature vectors of context words associated with each obtained word in the corpus by:
traversing the corpus after word segmentation, and performing the following actions in response to a current word being accessed during the traversal:
determining one or more context words and negative sample words associated with the current word in the corpus;
inputting a sequence formed by feature vectors of the context words associated with the current word into a sequence representation layer of the recurrent neural network to obtain a first vector;
inputting a feature vector of the current word into a full connection layer of the recurrent neural network to obtain a second vector; and
inputting a feature vector of a negative sample word associated with the current word into the full connection layer of the recurrent neural network to obtain a third vector; and
updating parameters of the recurrent neural network based, at least in part, on the first vector, the second vector, the third vector, and a loss function, wherein the loss function includes at least a weight parameter of the sequence representation layer, a weight parameter of the full connection layer, an offset parameter of the full connection layer, a hyperparameter, and a similarity calculation function; and
a generation module, configured to generate a word vector for each obtained word based, at least in part, on the feature vector of the obtained word and the trained recurrent neural network.

* * * * *